(12) United States Patent
Dill

(10) Patent No.: US 6,838,201 B2
(45) Date of Patent: Jan. 4, 2005

(54) FUEL CELL STACK COOLANT CONDUCTIVITY MONITORING CIRCUIT

(75) Inventor: Norman J. Dill, Walworth, NY (US)

(73) Assignee: General Motors Corporation, Detroit, MI (US)

( * ) Notice: Subject to any disclaimer, the term of this patent is extended or adjusted under 35 U.S.C. 154(b) by 358 days.

(21) Appl. No.: 10/120,704

(22) Filed: Apr. 11, 2002

(65) Prior Publication Data

US 2003/0193009 A1 Oct. 16, 2003

(51) Int. Cl.[7] .......................... H01M 8/04; H01M 8/00; H01J 40/14
(52) U.S. Cl. ............................. 429/23; 429/26; 429/12; 250/206; 250/214 R
(58) Field of Search .............................. 429/22, 23, 26, 429/120, 90, 92; 250/206, 214 R, 301, 552; 324/71.1, 522, 523, 525; 340/501, 514, 593, 635, 640, 641, 655, 660, 384.1; 702/64, 65, 58, 133, 134, 117; 338/20, 15, 48, 55

(56) References Cited

U.S. PATENT DOCUMENTS

| | | | | |
|---|---|---|---|---|
| 3,820,014 A | * | 6/1974 | Ludt | .......................... 324/439 |
| 3,964,929 A | | 6/1976 | Grevstad | |
| 4,074,176 A | | 2/1978 | Parke et al. | |
| 4,226,675 A | * | 10/1980 | Lewis et al. | .................. 376/256 |
| 5,085,949 A | | 2/1992 | Sanderson et al. | |
| 6,569,549 B1 | * | 5/2003 | Sawyer | .......................... 429/13 |
| 2002/0094460 A1 | | 7/2002 | Hortop | |
| 2002/0106543 A1 | * | 8/2002 | Sonntag et al. | ................ 429/24 |
| 2002/0192521 A1 | | 12/2002 | Raiser et al. | |

FOREIGN PATENT DOCUMENTS

| | | |
|---|---|---|
| EP | 0 982 788 A2 | 12/1999 |
| JP | 09-199151 | 7/1997 |

OTHER PUBLICATIONS

International Search Report dated Jun. 20, 2003; Int'l Appl. No. PCT/US03/10123.

* cited by examiner

*Primary Examiner*—Raymond Alejandro
(74) *Attorney, Agent, or Firm*—Cary W. Brooks, Esq.; Linda M. Deschere, Esq.

(57) ABSTRACT

A circuit configuration provides a simple device that can be used to monitor the voltage potential between any two points within the fuel cell coolant system without loading (i.e. decreasing) the voltage being monitored. The monitoring circuit include a lamp electrically coupled to the coolant system and arranged in a light-tight package with a photo-resistor. When the ionization voltage for the lamp is reached, a fully isolated signal is provided in the form of an abrupt resistance change in the photoresistor. Visual and audible indicators can be coupled to the monitoring circuit to indicate a coolant contamination condition.

20 Claims, 4 Drawing Sheets

FUEL CELL STACK COOLANT CONDUCTIVITY MONITORING CIRCUIT

FIELD OF THE INVENTION

The present invention relates to conductivity monitoring circuits, and more particularly to coolant conductivity monitoring circuits for fuel cell systems with a fuel cell stack.

BACKGROUND OF THE INVENTION

Fuel cells are emerging as a viable power source for many applications. In a fuel cell, an active element referred to as a membrane electrode assembly is sandwiched between sheets of porous, gas-permeable, conductive material which serve as the primary current collectors for the MEA and provide mechanical support therefore. The MEA/primary current collector assembly is pressed between a pair of non-porous, electrically conductive separator plates or metal sheets which serve as the secondary current collectors for the primary current collectors and conduct current between adjacent cells with the fuel cell stack.

The MEAs must operate within a desired temperature range. Since the chemical reaction within the fuel cell is exothermic, a fuel cell stack often utilizes some internal cooling system to extract heat therefrom. To this end, a separate cooling layer is in thermal contact with individual fuel cells within the stack. A coolant fluid is circulated through the coolant layer to remove the heat from the adjacent cells.

As the coolant ages it collects contaminates that cause it to become electrically conductive. Some stack designs depend on plate insulation coatings for electrical isolation of the coolant fluid. If the plate coatings crack or begin to leak electrically, the stack coolant could conduct a leakage current throughout the coolant loop. Thus, it is often desirable to monitor the conductivity of the coolant to detect such conditions.

Conventional means for monitoring the conductivity of a coolant loop employ a resistor connected between two conductive points in the coolant loop with a volt meter connected across it. However, this method creates an alternate current path in the circuit and ends up loading the voltage that is being monitored.

SUMMARY OF THE INVENTION

The present invention provides a simple device that can be used to monitor the voltage potential between any two points within the fuel cell coolant system without loading (i.e. decreasing) the voltage being monitored.

In a first preferred embodiment, the device combines a gas-filled lamp electrically coupled to the coolant system and arranged in a light-tight package with a photoresistor. This device does not induce any detectable leakage path until the ionization voltage or glow point of the lamp is reached. When the ionization voltage is reached, a fully isolated signal is provided in the form of an abrupt resistance change in the photoresistor. The resistance change ranges from nearly open when the voltage being monitored is below the ionization voltage to just a few hundred ohms when the voltage exceeds the ionization voltage of the lamp.

Accordingly, in one aspect of the present invention, a coolant contamination monitoring circuit for a fuel cell system is provided which includes a lamp operable in a non-illuminated state when a voltage build-up is less than a threshold value and an illuminated state when said voltage build-up is at least equal to the threshold value, a photoresistor located adjacent to the lamp that varies in resistance in response to illumination of the lamp so as to function as a switch that is open when the lamp is not illuminated and that is closed when the lamp is illuminated, and an optical isolator isolating the lamp and the photoresistor from ambient light. Visual and audible indicators may be coupled to the monitoring circuit to indicate a coolant contamination condition.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

Figure 1:
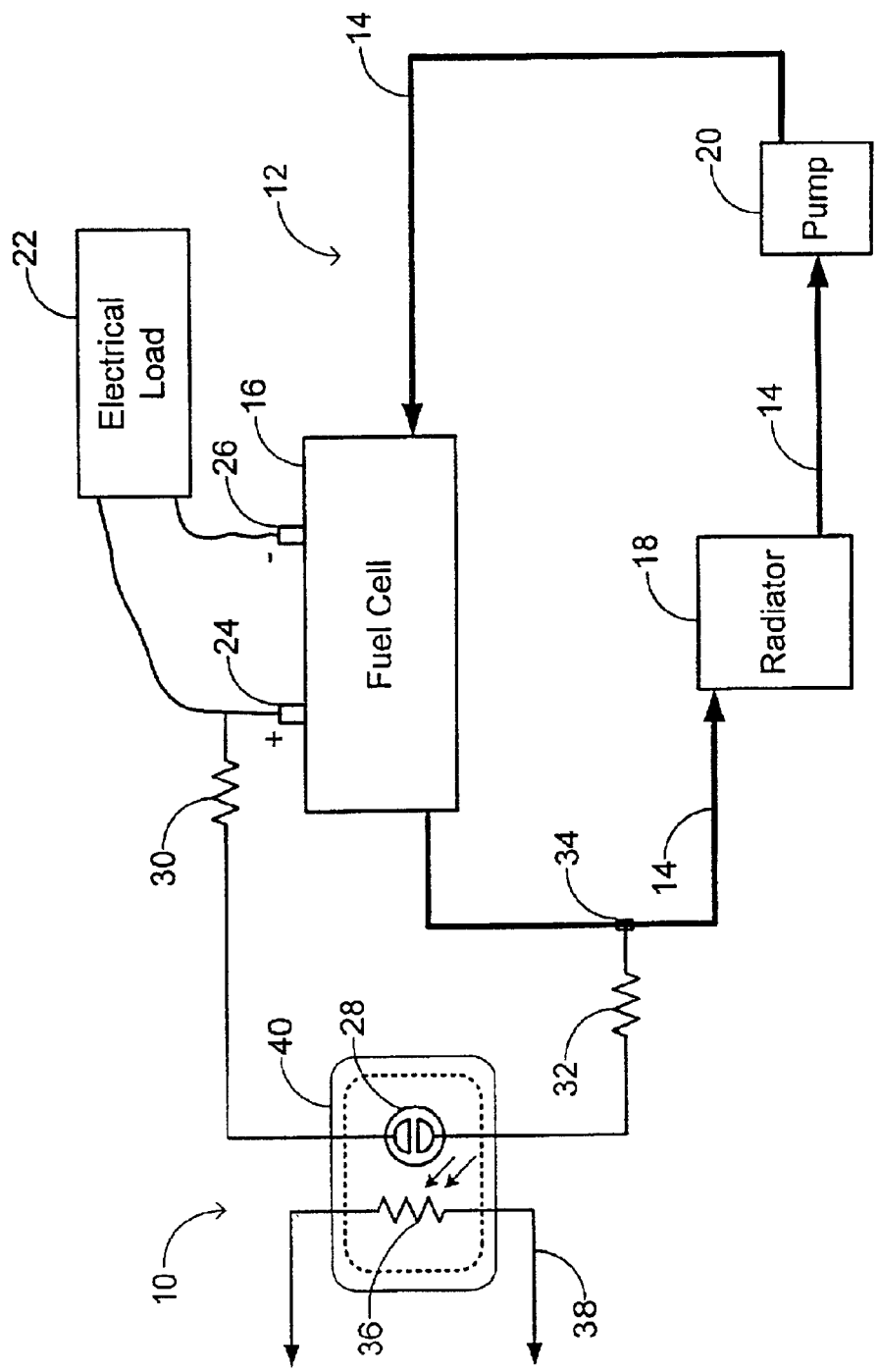
FIG. 1 is a schematic showing the coolant contamination monitoring circuit according to the present invention.

Referring to FIG. 1, a coolant contamination monitoring circuit 10 is connected to a fuel cell system 12 with a coolant loop 14. Coolant enters the fuel cell stack 16 for removing heat therefrom. The coolant continues through the other components in the coolant loop 14, including the radiator 18 (where the coolant is cooled) and pump 20, before returning to the stack 16. An electrical load 22 is powered by the positive terminal 24 and negative terminal 26 of the fuel cell stack 16.

The coolant contamination monitoring circuit 10 contains a lamp 28 that operates in a non-illuminated state when an applied voltage is less than a threshold value. The lamp 28 operates in an illuminated state when the applied voltage is at least equal to the threshold value. The lamp 28 is connected to the fuel cell system 12 by a first monitoring resistor 30 and a second monitoring resistor 32. The first monitoring resistor 30 is shown connected from one side of the lamp 28 to the positive terminal 24 of the fuel cell stack 16. The second monitoring resistor 32 is shown connected from the opposite side of the lamp 28 to a metal elbow 34 in the coolant loop 14 that is in conductive contact with the coolant. A skilled practitioner will recognize that the monitoring resistors 30 and 32 can connect to the fuel cell system 12 at any two points that are conductive with the coolant. For example, the first monitoring resistor 30 could be connected to another conductive point along the coolant loop 14 in a manner such as the second monitoring resistor 32. Alternatively, one of the monitoring resistors 30 and 32 could be connected to a point grounded to the vehicle chassis.

A photoresistor 36 is located adjacent to the lamp 28. The photoresistor 36 varies in resistance in response to the illumination of the lamp 28. When the lamp 28 is not illuminated, the resistance of the photoresistor 36 is very high, on the order of a mega ohm ($10^6 \Omega$) or more, which prevents useful current from flowing through the circuit 38 to which the photoresistor 36 is connected. When the lamp 28 illuminates, the resistance of the photoresistor 36 lowers enough, on the order of about a few 100 ohms, so that current may flow through the photoresistor 36 as well as the circuit 38 it is connected to. Actual values depend on the type of photoresistor used and its response to the intensity and color temperature of the light emitted by lamp 28. Both the photoresistor 36 and the lamp 28 are contained in an optical isolator 40 to shield both components from ambient light. The steep change in resistance of the photoresistor 36 can be thought to function as a switch that is open when the lamp 28 is not illuminated and is closed when the lamp 28 is illuminated.

The applied voltage that controls the illumination of the lamp 28 is a voltage build-up between the two monitoring resistors 30 and 32. The voltage build-up is a potential difference between the conductive points of the monitoring resistors 30 and 32. When the voltage build-up reaches the threshold value, the lamp 28 illuminates. The threshold value varies in accordance with a given application and is chosen to correspond with a voltage at which the conductivity in the coolant loop 14 becomes too high for the fuel cell system 12 to function efficiently.

The lamp 28 remains an open circuit and non-illuminated when the voltage build-up is below the threshold value. This prevents a leakage current from flowing through the coolant contamination monitoring circuit 10 until the voltage build-up reaches the threshold value and the lamp 28 illuminates. While the lamp 28 remains non-illuminated, loading (lowering) of the voltage that is being monitored is also prevented. The combination of the lamp 28 and photoresistor 36 allows for a fully isolated signal to be produced in the form of the abrupt resistance change in the photoresistor 36 when the lamp 28 illuminates. This makes it possible for an isolated alarm circuit to be connected to the photoresistor 36 that activates when the lamp 28 illuminates.

In a preferred embodiment, the lamp 28 is a gas-filled lamp that illuminates when the voltage build-up reaches the ionization voltage of the gas-filled lamp. The ionization voltage of the gas-filled lamp corresponds with the threshold value of the coolant contamination monitoring circuit 10. The ionization voltage is a value at which the gas in the gas-filled lamp will conduct current. In a highly preferred embodiment, the gas-filled lamp is comprised primarily of neon gas.

Figure 2:
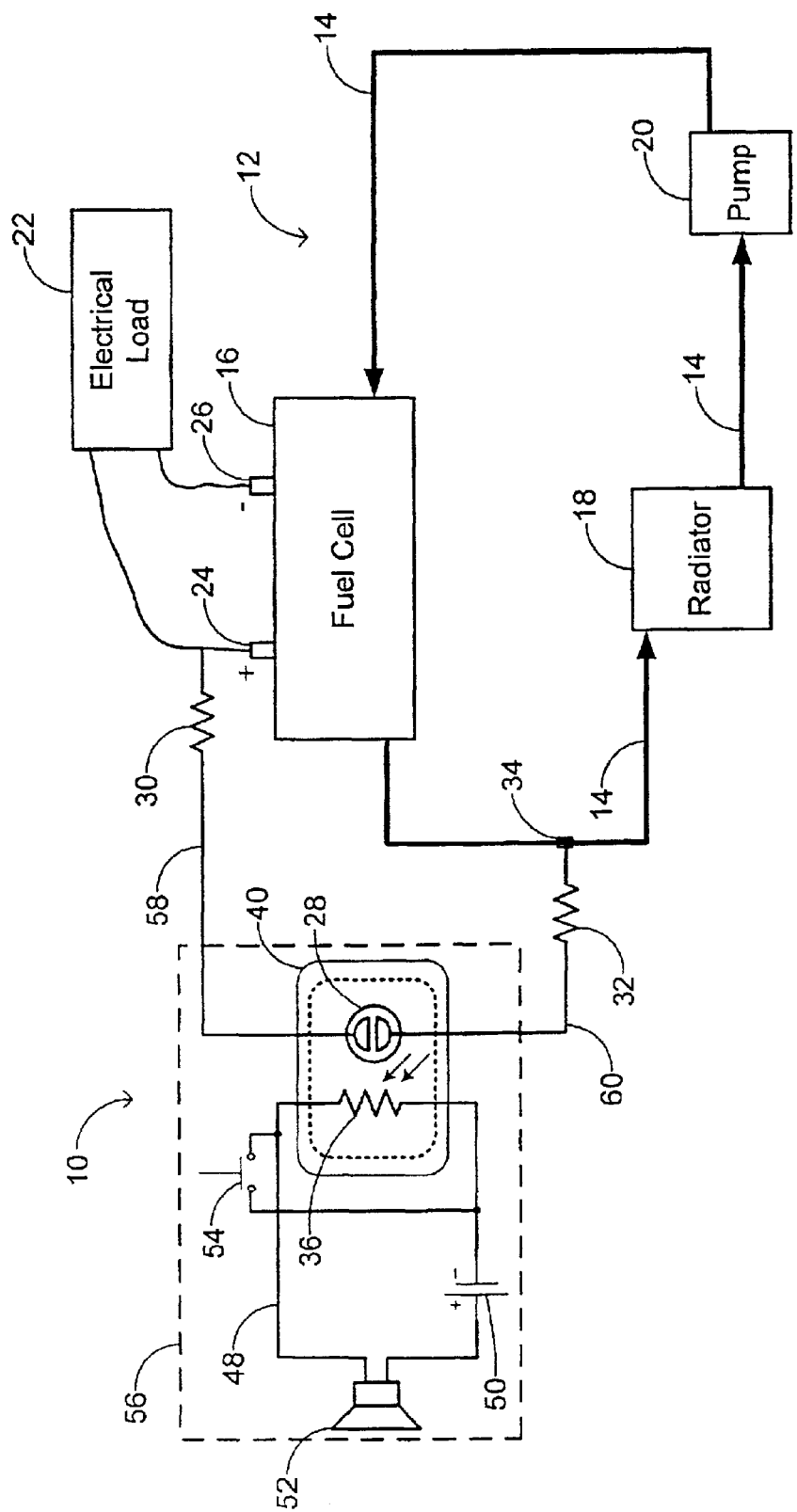
FIG. 2 is a schematic showing a battery-driven audible alarm circuit used with the monitoring circuit.

Referring now to FIG. 2, a battery-driven audible alarm circuit 48 is shown connected to the photoresistor 36. When the voltage build-up reaches the threshold value and the lamp 28 illuminates, the abrupt resistance change in the photoresistor 36 activates the audible alarm circuit 48. The audible alarm circuit 48 comprises a battery 50 and an audible indicator 52 in series with the photoresistor 36. In FIG. 2, the audible indicator 52 is a battery-driven piezo-type alarm. Additionally, a test button 54 is connected in parallel with the photoresistor 36. When pressed, the test button 54 shorts the photoresistor 36, allowing the operation of the audible alarm circuit 48 to be tested.

If the battery 50 has a long shelf-life and the test button 54 is included, the audible alarm circuit 48, along with the photoresistor 36 and lamp 28, may be manufactured as a disposable and completely packaged product 56. In this case, the first and second monitoring resistors 30 and 32 could be placed in the lead wires 58 and 60 close to the monitoring points 24 and 34. This eliminates the customary need for protective fuses and allows for the use of smaller connection wires while monitoring high voltage and high current potentials. The first and second monitoring resistors 30 and 32 are needed to limit the current through the lamp 28. When the lamp 28 is not illuminated, it acts as an open circuit. Once the voltage build-up reaches the threshold value, the lamp 28 becomes a closed circuit and allows current to flow. The first and second monitoring resistors 30 and 32 prevent excessive levels of current from going through the lamp 28 and damaging it.

Figure 3:
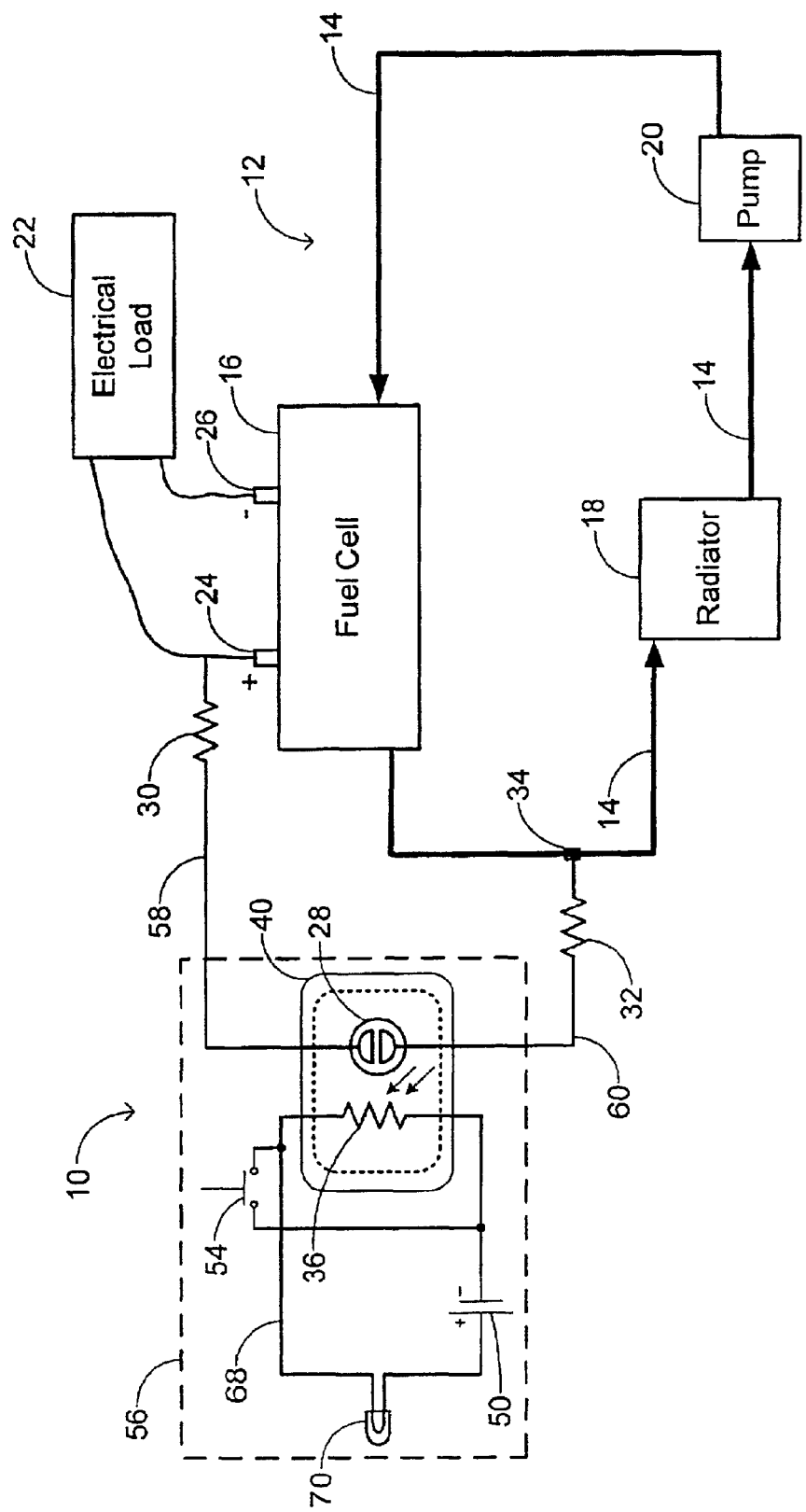
FIG. 3 is a schematic showing a battery-driven visual alarm circuit used with the monitoring circuit.

FIG. 3 shows a visual alarm circuit 68 connected to the photoresistor 36. When the voltage build-up reaches the threshold value and the lamp 28 illuminates, the abrupt resistance change in the photoresistor 36 activates the visual alarm circuit 68. The visual alarm circuit 68 includes a battery 50 and a visible indicator 70 connected in series with the photoresistor 36. In FIG. 3, the visible indicator 70 is a battery-operated lamp. Additionally, a test button 54 is connected in parallel with the photoresistor 36. Pressing the test button 54 shorts the photoresistor 36 to test the operation of the visual alarm circuit 68. If the battery 50 has a long shelf-life and the test button 54 is included, the visual alarm circuit 68, like the audible alarm circuit 48, may be manufactured as a disposable and completely packaged product 56.

Figure 4:
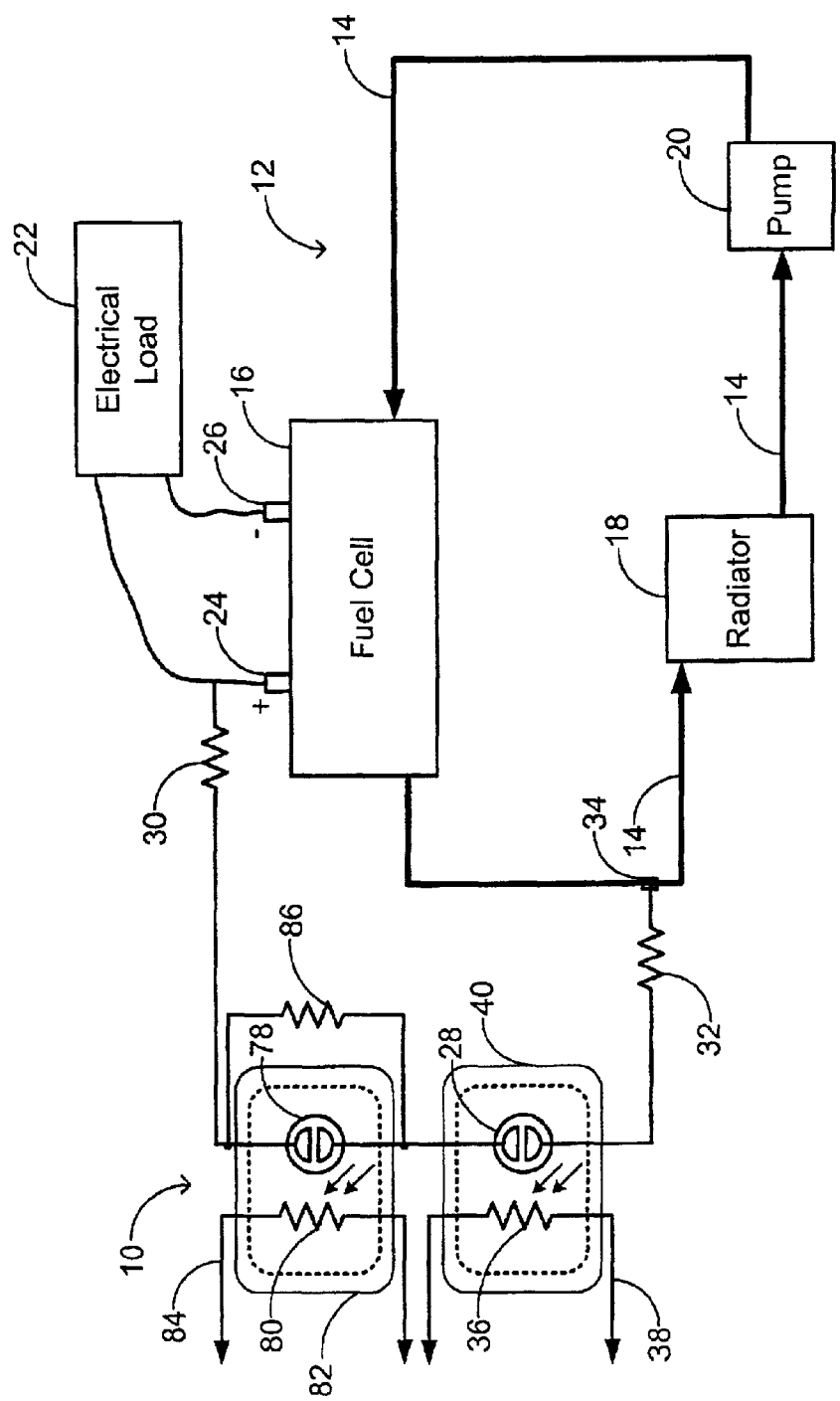
FIG. 4 is a schematic showing two lamps in series providing a two-stage alarm output in another feature of the present invention.

In another embodiment, a second lamp is used to provide a basic two-stage alarm having two monitoring voltage thresholds. Referring to FIG. 4, a first lamp 28 and a second lamp 78 are connected in series and both lamps 28, 78 operate in a non-illuminated state when the voltage build-up is less than the threshold value of the first lamp 28. The first lamp operates in an illuminated state when the voltage build-up is at least equal to a first threshold value associated with the first lamp 28 but below a second threshold value associated with the second lamp 78. The second lamp 78 remains non-illuminated. The first lamp 28 is located adjacent to the first photoresistor 36, in an optically coupled configuration inside a light tight optical coupler package that shields the lamp 28 and photoresistor 36 from all outside ambient light. The second lamp 78 is located adjacent to a second photoresistor 80, in a second light tight optical coupler package. Like the single lamp circuit, when lamp 28 illuminates, the resistance of photoresistor 36 lowers allowing current to flow in the first output. Since the second lamp 78 remains non-illuminated, no current will flow in the second output. As the voltage build-up increases to the threshold value of the second lamp 78, lamp 28 remains illuminated and lamp 78 will illuminated. With both lamps 28, 78 illuminated, both photoresistors 36, 80 will have lower resistance and current will flow in both alarm outputs.

The lamps 28, 78 remain an open circuit and non-illuminated when the voltage build-up is below the threshold value for the first lamp 28. This prevents a leakage current from flowing through the coolant contamination monitoring circuit 10 until the voltage build-up reaches the threshold value for lamp 28. While the lamps 28, 78 remain non-illuminated, loading (i.e. lowering) of the voltage that is being monitored is also prevented. The combination of the lamps 28, 78 and photoresistors 36, 80 allow for two fully isolated signals to be produced in the form of the abrupt resistance change in the photoresistors 36, 80 when the lamps illuminate. This makes it possible for two separate isolated alarm circuits to be driven—one from the photoresisotor 36, and the other from the photoresistor 80. Each alarm circuit will activate when the voltage build-up being monitored reaches the illumination point or threshold value of their respective lamps. This configuration will provide a two-stage monitor output, where the first stage (lower voltage) could be used as a warning signal and the second stage (higher voltage) could be used as a system shut down signal.

Having two lamps simply in series nearly doubles the threshold voltage to illuminate the lamps. As the voltage increases, the lamp with the lowest ionization voltage will illuminate first, compromising the two-stage operation of the coolant contamination monitoring circuit. To insure which lamp illuminates first, a high value resistor 86 is added in parallel with the second lamp 78. Resistor 86 allows the voltage to build-up across lamp 28 first, thereby insuring that the lower voltage alarm output conducts current first as the voltage being monitored increases.

In a preferred embodiment, the lamps 28, 78 are gas-filled lamps combined with a high value resistor to illuminate when two different voltage levels are reached. In a more preferred embodiment, the gas-filled lamps are primarily comprised of neon gas. Photoresistor 36 may be connected to an audible alarm circuit 48 as shown in FIG. 2. This would provide an audible warning that the voltage being monitored is increasing past its initial limits. Photoresistor 80 may be connected to a visual alarm circuit 68 as shown in FIG. 3. This would provide a visual and audible indication that the voltage being monitored has surpassed its initial limits and has reached its higher limit. Alternately, photoresistor 80 may be connected to an external circuit to provide a fuel cell system shut down in the event that the voltage being monitored reaches its upper limit.

The resistance of the first and second monitoring resistors 30 and 32, which are both equal, depends on the voltage to be monitored. The resistance limits the maximum current through the lamps after the threshold voltage has been reached. In the highly preferred embodiment of using neon gas-filled lamps, the coolant contamination monitoring circuit 10 is limited to monitoring voltage values that cause standard production neon lamps to ionize and glow. By creating new gas lamps with different gas compositions (such as neon, argon, krypton, xenon), pressures, and electrodes, new ionization voltage can be realized. These new ionization voltages could be designed to work directly with a variety of leakage current applications including lower voltage stack cooling systems.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A coolant contamination monitoring circuit for a fuel cell system comprising:
    a lamp operable in a non-illuminated state when a voltage build-up is less than a threshold value and an illuminated state when said voltage build-up is greater than or equal to said threshold value;
    a first resistor connected between a first terminal of said lamp and a first conductive point in a coolant loop;
    a second resistor connected between a second terminal of said lamp and a second conductive point in said coolant loop;
    a photoresistor located adjacent to said lamp that varies in resistance in response to illumination of said lamp so as to function as a switch that is open when said lamp is not illuminated and that is closed when said lamp is illuminated; and
    an optical isolator isolating said lamp and said photoresistor from ambient light.

2. The coolant contamination monitoring circuit of claim 1 wherein said voltage build-up is a potential difference between said first conductive point and said second conductive point in said coolant loop and is monitored while preventing loading of said potential difference when said voltage build-up is less than said threshold value.

3. The coolant contamination monitoring circuit of claim 1 wherein a leakage current in the monitoring circuit from said coolant loop is prevented until said build-up voltage reaches said threshold value.

4. The coolant contamination monitoring circuit of claim 1 wherein a fully isolated signal is produced in the form of an abrupt resistance change in said photoresistor when said build-up voltage reaches said threshold value and said lamp illuminates.

5. The coolant contamination monitoring circuit of claim 1 wherein said lamp comprises a gas-filled lamp that illuminates when said voltage build-up reaches an ionization voltage of said gas-filled lamp.

6. The coolant contamination monitoring circuit of claim 5 wherein said gas-filled lamp is primarily comprised of a neon gas.

7. The coolant contamination monitoring circuit of claim 4 wherein said abrupt resistance change in said photoresistor activates an audible alarm circuit when said voltage build-up reaches said threshold value and said lamp illuminates.

8. The coolant contamination monitoring circuit of claim 7 further comprising:
    a battery connected in series with said photoresistor;
    an audible indicator connected in series with said photoresistor and said battery; and
    a test button connected in parallel with said photoresistor.

9. The coolant contamination monitoring circuit of claim 4 wherein said abrupt resistance change in said photoresistor activates a visual alarm circuit when said voltage build-up reaches said threshold value and said lamp illuminates.

10. The coolant contamination monitoring circuit of claim 9 further comprising:
    a battery connected in series with said photoresistor;
    a visual indicator connected in series with said photoresistor and said battery; and
    a test button connected in parallel with said photoresistor.

11. A coolant contamination monitoring circuit for a fuel cell system comprising:
    a first lamp operable in a non-illuminated state when a voltage build-up is less than a first threshold value and an illuminated state when said voltage build-up is greater than or equal to said first threshold value;
    a second lamp connected in series with said first lamp and operable in a non-illuminated state when said voltage build-up is less than a second threshold value and an illuminated state when said voltage build-up is greater than or equal to said second threshold value, wherein said second threshold value is greater than said first threshold value;
    a first resistor connected in parallel with said second lamp;
    a first monitoring resistor connected between a first terminal of said first lamp and a first conductive point in a coolant loop;

a second monitoring resistor connected between a first terminal of said second lamp and a second conductive point in said coolant loop;

a first and second photoresistor located adjacent to said first and second lamps, each photoresistor varying in resistance in response to illumination of an adjacent lamp so as to function as a switch that is open when said adjacent lamp is not illuminated and that is closed when said adjacent lamp is illuminated; and optical isolators isolating said lamps and said photoresistors from ambient light.

12. The coolant contamination monitoring circuit of claim 11 wherein said voltage build-up is a potential difference between said first conductive point and said second conductive point in said coolant loop and is monitored while preventing loading of said potential difference when said voltage build-up is less than said threshold value.

13. The coolant contamination monitoring circuit of claim 11 wherein a leakage current in the monitoring circuit from said coolant loop is prevented until said build-up voltage reaches said threshold value.

14. The coolant contamination monitoring circuit of claim 11 wherein a fully isolated signal is produced in the form of an abrupt resistance change in said photoresistors when said build-up voltage reaches said threshold value and said lamps illuminate.

15. The coolant contamination monitoring circuit of claim 11 wherein each of said lamps comprise a gas-filled lamp that illuminates when said voltage build-up reaches an ionization voltage of said gas-filled lamp.

16. The coolant contamination monitoring circuit of claim 15 wherein said gas-filled lamps are comprised of a neon gas.

17. The coolant contamination monitoring circuit of claim 14 wherein said abrupt resistance change in one of said photoresistors activates an audible alarm circuit when said voltage build-up reaches said threshold value and said lamps illuminate.

18. The coolant contamination monitoring circuit of claim 17 further comprising:

a battery connected in series with said one of said photoresistors;

an audible indicator connected in series with said one of said photoresistors and said battery; and a test button connected in parallel with said one of said photoresistors.

19. The coolant contamination monitoring circuit of claim 14 wherein said abrupt resistance change in one of said photoresistors activates a visual alarm circuit when said voltage build-up reaches said threshold value and said lamps illuminate.

20. The coolant contamination monitoring circuit of claim 19 further comprising:

a battery connected in series with said one of said photoresistors;

a visual indicator connected in series with said one of said photoresistors and said battery; and a test button connected in parallel with said one of said photoresistors.

* * * * *